H. M. Paine.
Comb.
Nº 88,582.   Patented Apr. 6, 1869.
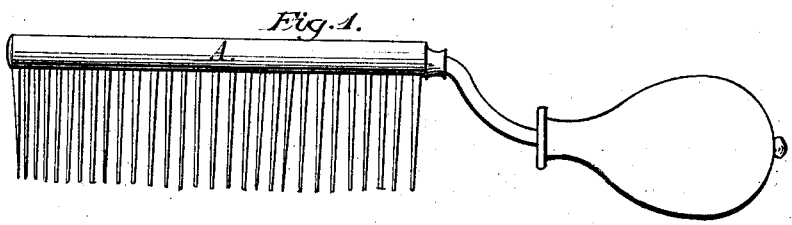
Fig. 2.  Fig. 3. 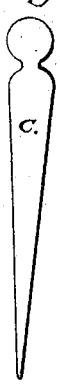 Fig. 4. 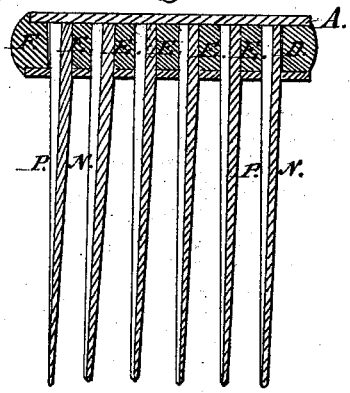
WITNESSES:
L. D. Towsley
John Davidson
INVENTOR:
Henry M. Paine

HENRY M. PAINE, OF NEWARK, NEW JERSEY.

Letters Patent No. 88,582, dated April 6, 1869.

IMPROVEMENT IN COMBS.

The Schedule referred to in these Letters Patent and making part of the same.

*To all whom it may concern:*

Be it known that I, HENRY M. PAINE, of the city of Newark, county of Essex, and State of New Jersey, have invented a new and useful Toilet-Comb; and I do hereby declare that the following is a full and exact description thereof, reference being had to the accompanying drawings, and to the letters of reference marked thereon.

The object of my invention is—

First, the production of a toilet-comb, of a durable and cleanly material; and,

Second, a comb whose teeth are so arranged as to induce galvanic action on the scalp when in contact therewith.

The back of the comb, A, Figure 1, is tubular, with a longitudinal aperture, as seen at B, Figure 2, which is a cross-section of A, fig. 1.

The teeth, C, Figure 3, are cut by dies, so as to fit exactly in the tube A and its aperture B.

The teeth are cut from a compound plate, made by soldering a plate of German silver and zinc together.

The several parts of the comb being ready, it is put together in the following manner:

A stud, D, Figure 4, is soldered firmly on one end of the tube A. Then a tooth is slid down the tube in contact with the stud. On the tooth, a lead washer, E is rammed, and so a tooth and washer in their order, as shown in the exaggerated longitudinal cross-section, fig. 4, till the desired length is obtained, when another stud, F, is soldered in its place, while the whole series is firmly pressed together.

The teeth should be placed in the order in which they are shown in fig. 4, where the white represents the position, and the band, the negative portions of the teeth.

I do not confine myself to the use of the metals herein designated, but any others may be used, whose combinations will evolve currents under the same conditions. Neither is it imperative that the metals be soldered together, but as zinc has little elasticity, I have, in this instance, united it with the silver.

What I claim as my invention, and desire to secure by Letters Patent, is—

A comb, whose teeth are composed of silver and zinc, or equivalent metals, for producing galvanic effects, substantially as herein set forth.

HENRY M. PAINE.

Witnesses:
   ROB'T JAGGARD,
   SAM'L SMITH.